Feb. 17, 1959 A. W. MASSMAN 2,874,289

COLOR TELEVISION RECEIVER OSCILLATOR CONTROL

Filed March 23, 1955 2 Sheets-Sheet 1

INVENTOR.
Albert W. Massman
BY
Mueller & Aichele
Attys.

Feb. 17, 1959 A. W. MASSMAN 2,874,289

COLOR TELEVISION RECEIVER OSCILLATOR CONTROL

Filed March 23. 1955 2 Sheets-Sheet 2

INVENTOR.
Albert W. Massman
BY
Mueller & Aichele
Attys.

United States Patent Office 2,874,289

Patented Feb. 17, 1959

2,874,289

COLOR TELEVISION RECEIVER OSCILLATOR CONTROL

Albert W. Massman, Wheaton, Ill., assignor to Motorola, Inc., Chicago, Ill., a corporation of Illinois Application March 23, 1955, Serial No. 496,236

9 Claims. (Cl. 250—36)

Figure 1:
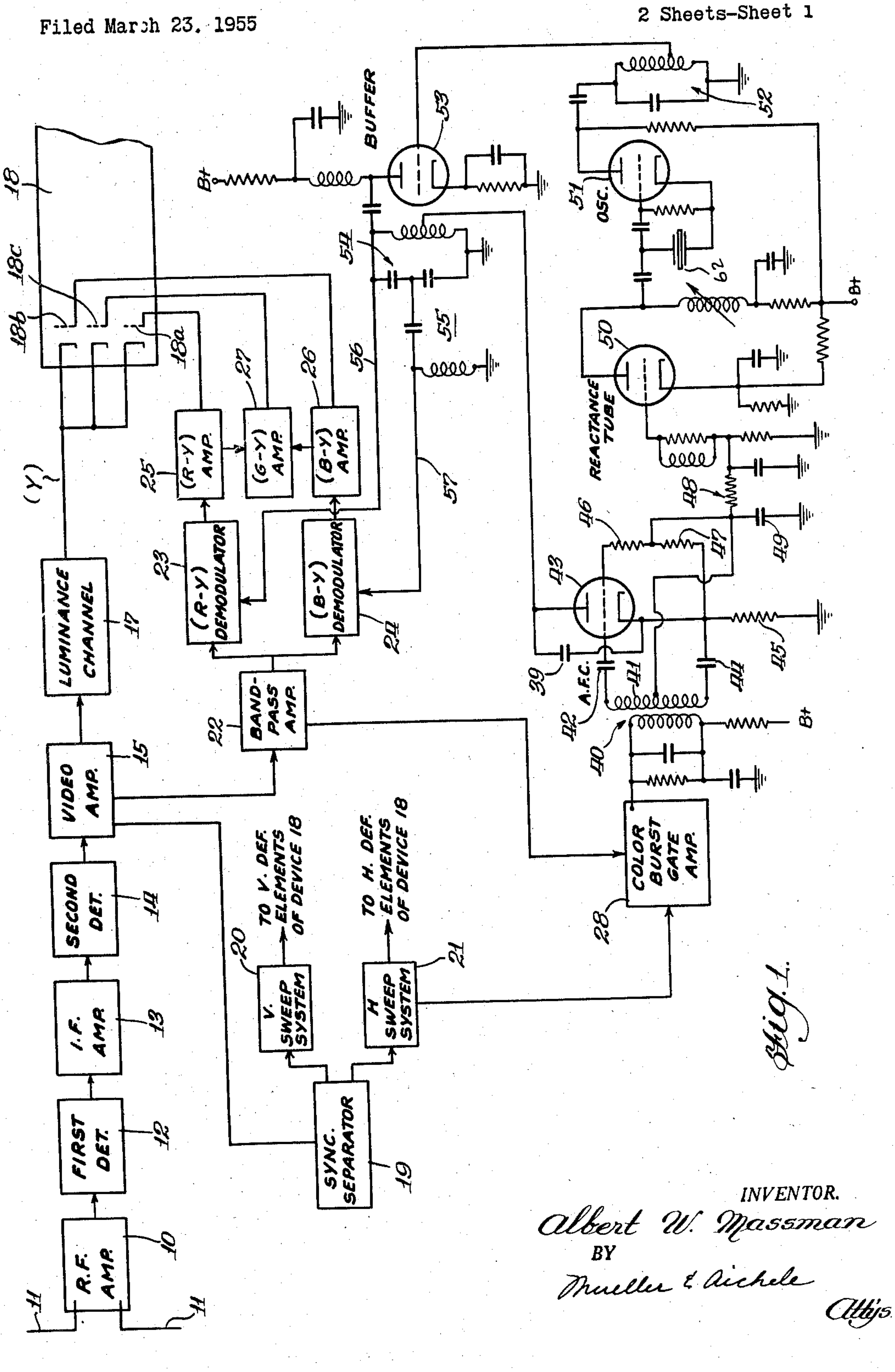

The present invention relates to color television receivers, and more particularly to an improved and simplified phase detector system that can be used for synchronizing the color oscillator of such a receiver with the chroma synchronizing component of a received color television signal.

In the present day standard color television signal, a chroma subcarrier is modulated by a pair of phase-quadrature signals respectively representing different chroma information. This subcarrier has a selected frequency, and each of the phase quadrature chroma signals is recovered at the receiver by different synchronous detectors. These detectors utilize respective ones of a pair of locally generated phase quadrature reference signals to recover the two distinct chroma signals modulated on the chroma subcarrier. These phase quadrature reference signals are generated at the receiver by a color oscillator which is usually a crystal-controlled type for high frequency stability. In order that the oscillator may be synchronized as to frequency and phase with the chroma subcarrier, the standard color television signal also includes sinusoidal bursts of a color synchronizing wave which has the frequency of the subcarrier and a selected phase relation with the two distinct chroma signals modulated thereon.

It is usual in most color receivers to provide an automatic frequency control for the sinusoidal color oscillator which compares the sinusoidal continuous output wave from the oscillator with the received bursts of the color synchronizing wave to produce a control signal, and which control signal is used by a reactance tube circuit to control the frequency of the oscillator so that it is maintained precisely synchronized as to frequency and phase with the chroma subcarrier.

It is an object of the present invention to provide an improved and simplified phase detector that is particularly suited for use in a color receiver for synchronizing the color oscillator with the color synchronizing component of a received color television signal.

A further object of the invention is to provide a synchronizing system for the color oscillator of a color television receiver which is relatively immune to noise disturbances and the like, and which is inherently simple in its construction as compared with prior art systems exhibiting similar characteristics.

A feature of the invention is the provision of a synchronizing system for the color oscillator of a color receiver which may incorporate a simple triode connected to compare the continuous output wave of the oscillator with received color synchronizing bursts to develop a control signal for controlling the oscillator, and which system exhibits a balanced characteristic to the received bursts so as to be relatively unresponsive to noise or other disturbances.

Another feature of the invention is the provision of such an improved synchronizing system in which the control signal developed thereby may be conveniently utilized by a reactance tube circuit to control the frequency of the color oscillator to achieve the desired synchronism between the oscillator and the color synchronizing bursts.

Yet another feature of the invention is the provision of a modification of such a synchronizing system in which the anode of the triode utilized therein is directly connected to the frequency-determining circuit of the color oscillator to derive the continuous output wave of the oscillator for comparison purposes and also to exert a control on the frequency of the oscillator, the control voltage developed by the system being supplied directly to the oscillator without the need for a reactance tube circuit as in prior art systems.

Figure 2:
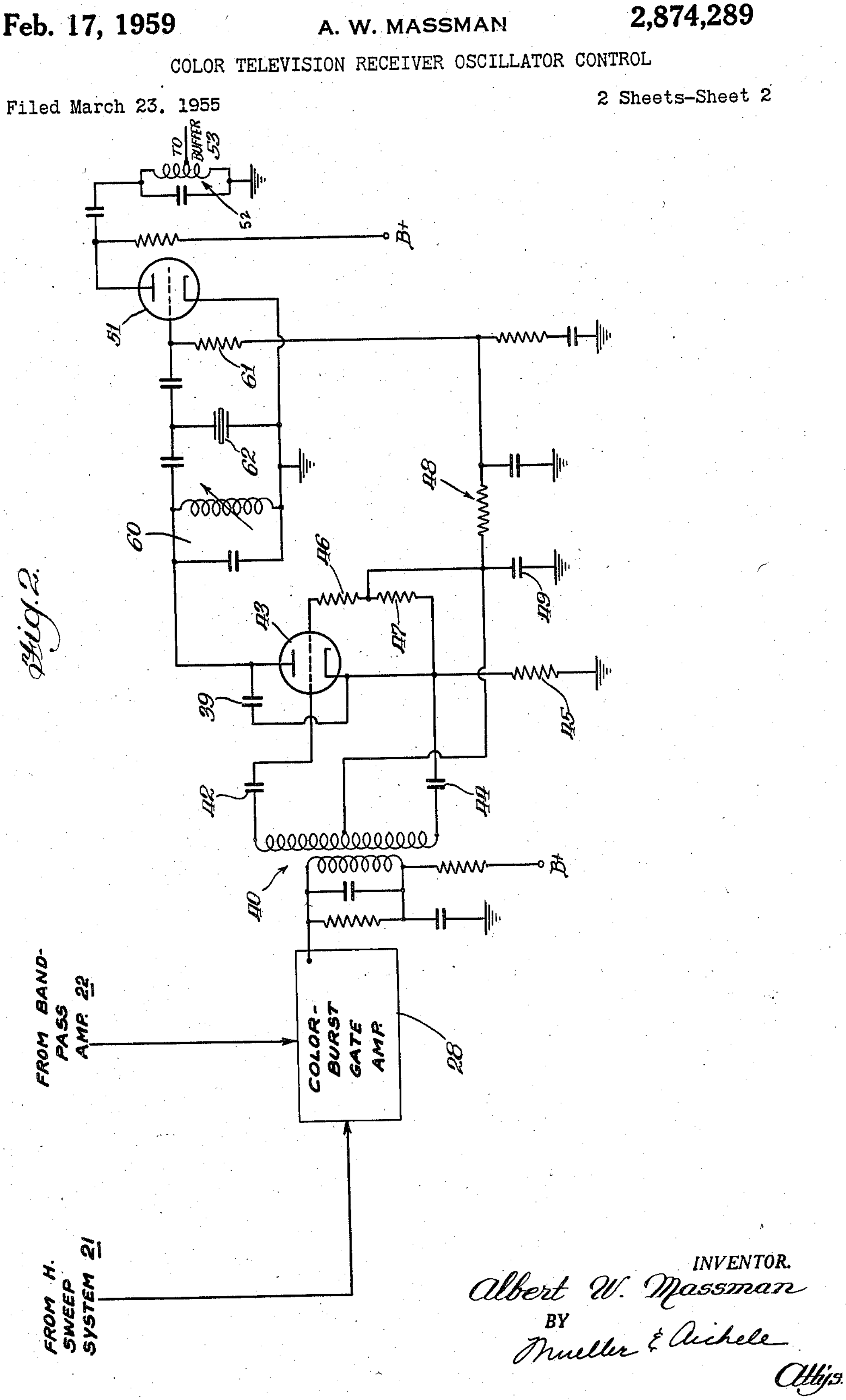

The above and other features of the invention which are believed to be new are set forth with particularity in the appended claims. The invention itself, however, together with further objects and advantages thereof may best be understood by reference to the following description when taken in conjunction with the accompanying drawing in which:

Fig. 1 shows a television receiver constructed to incorporate the improved synchronizing system of the invention; and Fig. 2 is a modification of the synchronizing system of the invention.

The invention is intended to be used particularly in a color television receiver of the type including a source of sinusoidal bursts of a color synchronizing wave and which also includes a color oscillator to be synchronized as to frequency and phase with such bursts. The invention provides a synchronizing system which includes an electron control valve having at least three electrodes. Means responsive to the sinusoidal bursts from the source produces a first series of sinusoidal bursts and a second series of sinusoidal bursts respectively in phase and in phase opposition with the synchronizing wave. Further means applies the first series of bursts to a first of the electrodes of the control valve so as to establish a bias of a selected polarity on that electrode, and still further means applies the second series of bursts to a second of the electrodes to establish on the second electrode a bias of opposite polarity with respect to the bias on the first electrode. Resistance means is connected between the second electrode and a point of reference potential, and further resistance means is connected from the first electrode to the second electrode. Means is provided for deriving a continuous sinusoidal wave from the color oscillator and for applying that wave to a third of the electrodes to control the bias on the second electrode in accordance with the phase relation between the continuous wave and the color synchronizing wave. Finally, means is coupled to an intermediate point on the further resistance means for developing a control signal varying in accordance with phase deviations between the continuous wave and the synchronizing wave, and further means is provided for utilizing the control signal to control the frequency of the color oscillator.

The color receiver of Fig. 1 is shown with portions thereof in block form, but with those portions with which the present invention is particularly concerned being shown in circuit detail. The entire receiver is shown merely to facilitate and clarify the explanation of the invention, and blocks are used wherever possible to keep the specification unencumbered by superfluous detail not necessary for the full description of the invention.

The color receiver of Fig. 1 includes a radio frequency amplifier 10 having input terminals connected to an antenna 11 and having output terminals connected through a first detector 12 to an intermediate frequency amplifier 13. The intermediate frequency amplifier is connected through a second detector 14 and video amplifier 15 to the luminance channel 17 of the receiver, and the output terminal of the luminance channel is connected to the cathode of a tri-gun cathode ray image reproducer 18.

Video amplifier 15 is also connected to a synchronizing signal separator 19 which has output terminals connected respectively to a vertical sweep system 20 and to a horizontal sweep system 21. The output terminals of sweep systems 20 and 21 are connected respectively to the vertical and horizontal deflection elements of device 18.

Video amplifier 15 is also connected to a band-pass amplifier 22 whose output terminal is connected to the $(R-Y)$ chroma demodulator 23 and to the $(B-Y)$ chroma demodulator 24. Demodulators 23 and 24 are respectively coupled through amplifiers 25 and 26 to control electrodes **18*a*, 18*b* in device 18. Amplifiers 25 and 26 are connected to a $(G-Y)$ amplifier 27 which contains an appropriate matrixing network and which is connected to the control electrode 18*c* of device 18**.

The operation of the receiver thus far described briefly is as follows. As previously noted, the color television signal contains a chroma subcarrier which is amplitude modulated by respective $(R-Y)$ and $(B-Y)$ chroma signals in phase quadrature with one another. The color television signal also includes a luminance or brightness signal that is directly modulated on the main carrier. The color television signal is intercepted by antenna 11, amplified heterodyned and again amplified in stages 10–13, and detected in stage 14 to produce a composite video signal which is amplified in video amplifier 15. The luminance component of the composite video signal is selected by luminance channel 17 and supplied to the cathodes of device 18. The chroma subcarrier is selected by band-pass amplifier 22 and supplied to the chroma demodulators 23, 24 which recover the $(R-Y)$ and $(B-Y)$ color-difference signals. These color-difference signals are mixed with the luminance component in device 18 to produce respectively the red and blue chroma signals. Moreover, these color-difference signals are matrixed in amplifier 27 to produce the $(G-Y)$ color-difference signal, and the latter is mixed with the luminance component in device 18 to produce the green chroma signal. The operation of the color receiver as briefly set forth above is known, and a more detailed explanation is deemed to be unnecessary.

In order that chroma demodulators 23, 24 may properly select and demodulate the different chroma color-difference signals from the chroma subcarrier, it is necessary that these demodulators be supplied with a pair of phase quadrature reference signals having the frequency of the chroma subcarrier, with the reference signals being respectively in phase and in phase quadrature with the modulation of the chroma signals on the subcarrier. These reference signals precisely synchronized with the received color television signal are produced in the following manner.

Band-pass amplifier 22 and horizontal sweep system 21 are connected to a color burst amplifier 28, and amplifier 28 functions in known manner to select and amplify the sinusoidal bursts of the color synchronizing wave included in the color television signal and referred to previously herein.

The output terminal of amplifier 28 is connected to the primary winding of a coupling transformer 40, the transformer having a secondary winding 41 which may be considered an inductance means. One end of inductance means 41 is coupled through a capacitor 42 to the control grid of an electron discharge device 43, and the other end of inductance means 41 is coupled through a capacitor 44 to the cathode of that discharge device. A resistor 45 connects the cathode to a point of reference potential or ground, and a pair of resistors 46, 47 connects the control grid to the cathode. Resistors 46, 47 perform a balancing function and have equal values so as to form a resistance means whose mid-point is constituted by the common junction between these resistors.

The mid-point of inductance means 41 is connected to the mid-point of resistance means 46, 47 and these points are connected to a low-pass filter 48 which includes a capacitor 49 which by-passes the alternating current signals appearing at the junction of resistors 46, 47 and at the center-tap of inductance means 41 to ground.

Low-pass filter 48 is connected to a reactance tube circuit which includes a reactance tube 50 connected in known manner, and the reactance tube circuit is connected to a crystal oscillator including an electron discharge device 51 which, also, is connected in known manner. The anode of device 51 is connected to ground through a resonant network 52 tuned to the frequency of the oscillator which is to be the reference frequency and this network is connected to the control grid of an electron discharge device 53, the latter device being connected as a buffer amplifier. The anode of device 53 is connected to ground through a resonant network 54 tuned to the desired reference frequency, and network 54 is shunted by a quadrature phase shifting network 55. A first reference signal for demodulator 23 is derived on lead 56 and a second reference signal for demodulator 24 in phase quadrature with the first is derived on lead 57.

Inductance means 41 responds to the sinusoidal bursts from amplifier 28 to supply a first series of sinusoidal bursts having the frequency and phase of those from this amplifier to the control grid of device 43 to develop a negative bias on that grid. The inductance means 41 also supplies a second series of sinusoidal bursts in phase opposition to the bursts from amplifier 28, and the second series is supplied to the cathode of device 43 to establish a positive bias on the cathode. In the absence of a signal on the anode of device 43, the mid-point of resistors 46, 47 therefore is established at zero voltage and noise disturbances and the like also tend to cancel across these resistors. The phase detector circuit of device 43 therefore is essentially balanced for noise.

Crystal control oscillator 51 develops a signal that is precisely controlled to have the frequency of the chroma subcarrier, and this signal is supplied to buffer 53 so that the phase quadrature reference signals for the respective chroma demodulators can be produced on leads 56 and 57. The frequency of oscillator 51 is controlled by reactance tube circuit 50 which, in turn, responds to the control voltage developed by device 43 at the junction of resistors 46, 47 after passing through the low-pass filter 48. A continuous sine-wave signal is supplied to the anode of device 43 from a tap on the inductive portion of resonant network 54, and this continuous wave controls the bias on the cathode of device 43 in accordance with the phase relation between the continuous wave and the color synchronizing wave as represented by the burst from amplifier 28. As the bias across resistor 45 varies between certain positive limits in response to phase variations between the continuous wave and the sinusoidal bursts, the control signal supplied to reactance tube 50 varies on either side of zero, this control voltage being established essentially at zero for a 90° phase relation between the color synchronizing wave and the continuous wave derived from resonant network 54.

With the construction described above, precise and accurate control of the color oscillator has been realized and without the need for the more complicated circuits of the prior art. It has been found that the circuit of device 43 is capable of rigidly maintaining a desired phase and frequency relation between the reference signals on leads 56 and 57 and the modulated chroma subcarrier supplied to the chroma demodulators 23, 24. Moreover, the circuit is relatively immune to noise and other disturbances due to the balancing of resistors 46, 47, and it does not exhibit a tendency to pull the system out of synchronization during moments of lost color sync bursts since the control signal applied to reactance tube 50 returns to zero during such moments.

It is usual to provide a feedback capacitor 39 between the anode and cathode of device 43. This capacitor is made large enough to cancel the effects of grid-to-anode capacitance of the tube used.

In the embodiment of Fig. 2, the anode of device 43 is directly connected through a direct current connection to the frequency determining circuit 60 of oscillator 51, and the output of low-pass filter 48 is connected through grid resistance 61 to the control group of oscillator device 51. It can be seen that this latter embodiment does not require a separate reactance tube circuit for controlling the oscillator, thus further simplifying the synchronizing system.

The control voltage from the filter 48 changes the reflected capacity of the oscillator device 51 which controls the frequency of the crystal 62 which shunts the resonant network 60 in a usual connection. Therefore, some measure of frequency control of the oscillator is obtained by the control signal of filter 48. There appears to be a primary or principal effect however, and that is the fact that device 43 amplifies the sinusoidal bursts from transformer 40, and these are directly impressed on the resonant network 60 to synchronize the frequency and phase of the oscillator by a sort of shock-exciting action. It has been found that the amplified bursts so impressed on the tuned network 60 have a tendency to maintain the oscillator synchronized as to frequency and in phase quadrature with the bursts, whereas the control signal applied to grid 61 has the same effect. These two control forces, therefore, act together to control the frequency and phase of the continuous signal from the oscillator with respect to the color synchronizing signal.

This invention provides, therefore, an improved balanced phase detector that may be used as a synchronizing system in a color television receiver and which is inherently simple and economical in its construction, and yet which performs with a high degree of efficiency precisely and rigidly to maintain the color oscillator at a desired frequency and phase with respect to the chroma subcarrier.

I claim:

1. In a color television receiver which includes means for deriving sinusoidal bursts of a high frequency color synchronizing wave, and a color oscillator to be synchronized as to frequency and phase with such bursts, the combination of an electron control valve having first and second and third electrodes, inductance means responsive to sinusoidal bursts from the deriving means for producing a first series of sinusoidal bursts and a second series of sinusoidal bursts in phase opposition with one another, means for applying said first series of bursts to said first electrode of said control valve to establish a bias of a selected polarity on said first electrode, means for applying said second series of bursts to said second electrode of said control valve to establish on said second electrode a bias of opposite polarity with respect to the bias on said first electrode, impedance means connected from said second electrode to a point of reference potential, further impedance means connected from said first electrode to said second electrode, means for deriving a continuous sinusoidal wave from the color oscillator and for applying said continuous wave to said third electrode to control the bias on said first electrode in accordance with the phase relation between said continuous wave and said color synchronizing wave, and means coupled to an intermediate point on said further impedance means for developing a control signal varying in accordance with phase deviations between said continuous wave and said synchronizing wave, and means for utilizing said control signal to control the frequency of the color oscillator.

2. In a color television receiver which includes means for deriving sinusoidal bursts of a high frequency color synchronizing wave, and a color oscillator to be synchronized as to frequency and phase with such bursts, the combination of an electron discharge device having an anode and a cathode and a control grid, inductance means responsive to sinusoidal bursts from said deriving means for producing a pair of series of sinusoidal bursts respectively in phase and in phase opposition with the color synchronizing wave, means for applying a first of said pair of series of bursts to said control grid to establish a negative bias on said control grid, means for applying a second of said pair of series of bursts to said cathode to establish a positive bias on said cathode, resistance means connected from said cathode to a point of reference potential, further resistance means connected from said control grid to said cathode, means for deriving a continuous sinusoidal wave from the color oscillator and for applying said continuous wave to said anode to control the bias on said cathode in accordance with the phase relation between said continuous wave and said color synchronizing wave, means coupled to an intermediate point on said further resistance means for developing a control signal varying in accordance with phase variations between said continuous wave and said synchronizing wave, and means for utilizing said control signal to control the frequency of the color oscillator.

3. A detector for use in a color television receiver for comparing the phase of a first sinusoidal signal at the frequency of the color synchronizing wave with the phase of a second sinusoidal signal at such frequency, said detector including in combination, an electron discharge device having an anode and a cathode and a control electrode, inductance means responsive to the first sinusoidal signal for producing a pair of sinusoidal signals respectively in phase and in phase opposition with said first signal, means for applying one of said pair of signals to said control electrode to establish a negative bias on said control electrode, means for applying the other of said pair of signals to said cathode to establish a positive bias on said cathode, resistance means connected from said cathode to a point of reference potential, further resistance means connected from said control electrode to said cathode, means for applying said second sinusoidal signal to said anode to control the bias on said cathode in accordance with the phase relation between said first and second sinusoidal signals, and capacitor means connected between said anode and said cathode of said discharge device for neutralizing the grid to anode capacitance of said device, and filter means coupled to an intermediate point on said further resistance means for deriving an output signal from the detector.

4. In a color television receiver which includes a source of sinusoidal bursts of a color synchronizing wave, and a color oscillator which is to be synchronized as to frequency and phase with such bursts, the combination of an electron discharge device having an anode and a cathode and a control grid, means including an inductance coil coupled to the source and responsive to the sinusoidal bursts therefrom for producing a pair of series of sinusoidal bursts respectively in phase and in phase opposition with the color synchronizing wave, capacitor means coupled between one end of said inductance means and said cathode for applying a first of said pair of series of bursts to said cathode to establish a positive bias on said cathode, further capacitor means coupled between the other end of said inductance means and said control grid for applying a second of said pair of series of bursts to said control grid to establish a negative bias on said control grid, resistance means connecting said cathode to a point of reference potential, further resistance means connected between said control grid and said cathode, a connection extending from an intermediate point on said inductance means to an intermediate point on said further resistance means, means for deriving a continuous sinusoidal wave from the color oscillator and for applying said continuous wave to said anode to control the bias on said cathode in accordance with the phase relation between said continuous wave and said color synchronizing wave, filter means coupled to said intermediate point on said further resistance means for developing a control signal varying in accordance with phase variations between said continuous wave and said color synchronizing wave, and means for utilizing said control signal to control the frequency of the color oscillator.

5. In a color television receiver which includes a source of sinusoidal bursts of a color synchronizing wave, a color oscillator which is to be synchronized as to frequency and phase with such bursts, and a reactance tube circuit for controlling the frequency of the oscillator, the combination of an electron discharge device having an anode and a cathode and a control grid, means including an inductance coil coupled to the source for producing a pair of series of sinusoidal bursts respectively in phase and in phase opposition with the color synchronizing wave, capacitor means coupling one end of said inductance means to said cathode for applying a first of said pair of series of bursts to said cathode to establish a positive bias thereon, further capacitor means coupling the other end of said inductance means to said control grid for applying a second of said pair of series of bursts to said control grid to establish a negative bias on said control grid, resistance means connecting said cathode to a point of reference potential, further resistance means connected between said control grid and said cathode, a connection extending from the mid-point on said inductance means to the mid-point on said further resistance means, means for deriving a continuous sinusoidal wave from the color oscillator and for applying said continuous wave to said anode to control the bias on said cathode in accordance with the phase relation between said continuous wave and said color synchronizing wave, filter means coupled to said mid-point on said further resistance means for developing a control signal varying in accordance with phase variations between said continuous wave and said color synchronizing wave, and means for supplying the control signal to the reactance tube circuit to control the frequency of the color oscillator.

6. A detector for use in a color television receiver for comparing the phase of a first sinusoidal signal at the frequency of the color synchronizing wave with the phase of a second sinusoidal signal at such frequency, said detector including in combination, an electron discharge device having an anode and a cathode and a control electrode, inductance means responsive to the first sinusoidal signal for producing a pair of sinusoidal signals respectively in phase and in phase opposition with said first signal, capacitor means coupling one end of said inductance means to said cathode for applying one of said pair of signals to said cathode to establish a positive bias on said cathode, further capacitor means coupling the other end of said inductance means to said control electrode for applying the other of said pair of signals to said control electrode to establish a negative bias thereon, resistance means connected from said cathode to a point of reference potential, further resistance means connected from said control electrode to said cathode, a connection extending from the mid-point of said inductance means to the mid-point of said further resistance means, means for applying the second sinusoidal wave to said anode to control the bias on said cathode in accordance with the phase relation between said first and second sinusoidal signals, and filter means coupled to said mid-point on said further resistance means and including a capacitive path to said point of reference potential for bypassing said sinusoidal signals, said filter means deriving an output signal from the detector.

7. In a color television receiver which includes a source of sinusoidal bursts of a color synchronizing wave, the combination of a crystal-controlled color oscillator which includes an inductance-capacity frequency-determining circuit and which oscillator is to be synchronized as to frequency and phase with such bursts, an electron discharge device having an anode and a cathode and a control grid, inductance means coupled to the source and responsive to the sinusoidal bursts therefrom for producing a pair of series of sinusoidal bursts respectively in phase and in phase opposition with the color synchronizing wave, capacitor means coupled between one end of said inductance means and said cathode for applying a first of said pair of series of bursts to said cathode to establish a positive bias on said cathode, further capacitor means coupled between the other end of said inductance means and said control grid for applying a second of said pair of series of bursts to said control grid to establish a negative bias on said control grid, resistance means connecting said cathode to a point of reference potential, further resistance means connected between said control grid and said cathode, a connection extending from an intermediate point on said inductance means to an intermediate point on said further resistance means, means for coupling said anode to said frequency-determining circuit for controlling the frequency of said oscillator and for deriving a continuous wave to control the bias on said cathode in accordance with the phase relation between such continuous wave and said color synchronizing wave, filter means coupled to said intermediate point on said further resistance means for developing a control signal varying in accordance with phase variations between said continuous wave and said color synchronizing wave, and means for utilizing said control signal to control the frequency of the color oscillator.

8. In a color television receiver which includes a source of sinusoidal bursts of a color synchronizing wave, the combination of a color oscillator which includes an inductance-capacity frequency-determining circuit and which is to be synchronized as to frequency and phase with such bursts, an electron valve having at least first and second and third electrodes, means coupled to the source and responsive to the sinusoidal bursts therefrom for producing a pair of series of sinusoidal bursts respectively in phase and in phase opposition with the color synchronizing wave, means for applying one series of said pair of bursts to said first electrode to establish a bias thereon of a selected polarity, further means for supplying the other series of said pair of bursts to said second electrode to establish a bias thereon of opposite polarity to the bias established on said first electrode, resistance means connecting said second electrode to a point of reference potential, further resistance means connected between said first and second electrodes, and means for coupling said third electrode to said frequency-determining circuit for deriving the wave therefrom and for applying amplified sinusoidal bursts to said frequency-determining circuit to thereby control the frequency of said oscillator.

9. In a color television receiver which includes a source of sinusoidal bursts of a color synchronizing wave, the combination of a crystal-controlled color oscillator which includes a first electron discharge device having a control grid and a cathode; and which further includes an inductance-capacity frequency-determining circuit connected between said control grid and cathode, and a crystal connected in shunt with said frequency determining circuit; and which oscillator is to be synchronized as to frequency and phase with such bursts; a second electron discharge device having an anode, a cathode and a control grid; inductance means coupled to the source and responsive to the sinusoidal bursts therefrom for producing a pair of sinusoidal bursts respectively in phase and in phase opposition with the color synchronizing wave; capacitor means coupled between one end of said inductance means and said cathode of said second device for applying one series of said pair to such cathode to establish a positive bias thereon, further capacitor means coupled between the other end of said inductance means and said control grid of said second device for applying the other series of said pair to such control grid to establish a negative bias thereon, resistance means connecting said cathode of said second device to a point of reference potential, further resistance means connected between said control grid and said cathode of said second device, a connection extending from an intermediate point on said inductance means to an intermediate point on said further resistance means, a direct current connection extending from said anode of said second device to said frequency-determining circuit for controlling the frequency of the oscillator and for deriving a continuous wave, said continuous wave controlling the bias on said cathode of said second device in accordance with the phase relation between said continuous wave and said color synchronizing wave, further means coupled to said intermediate point on said further resistance means for developing a control signal varying in accordance with phase variations between said continuous wave and said color synchronizing wave, and a connection extending from said further means to said control grid of said first device to control the reflected capacity of said first device to said crystal further to control the frequency of the oscillator.

References Cited in the file of this patent

UNITED STATES PATENTS

| | | |
|---|---|---|
| 2,594,380 | Barton | Apr. 29, 1952 |
| 2,645,717 | Massman | July 14, 1953 |
| 2,692,908 | Jepmond | Oct. 26, 1954 |
| 2,706,217 | Rhodes | Apr. 12, 1955 |